United States Patent
Barabash et al.

(10) Patent No.: US 11,102,080 B2
(45) Date of Patent: Aug. 24, 2021

(54) NETWORK LAYER METHOD OF CONFIGURATION OF A BARE-METAL SERVER IN A VIRTUAL NETWORK

(71) Applicant: International Business Machines Corporation, Armonk, NY (US)

(72) Inventors: Katherine Barabash, Haifa (IL); Renato Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/515,061

(22) Filed: Jul. 18, 2019

(65) Prior Publication Data
US 2021/0021475 A1    Jan. 21, 2021

(51) Int. Cl.
*H04L 12/24* (2006.01)
*H04L 12/46* (2006.01)
*H04L 29/08* (2006.01)

(52) U.S. Cl.
CPC .......... *H04L 41/12* (2013.01); *H04L 12/4633* (2013.01); *H04L 41/0213* (2013.01); *H04L 67/10* (2013.01); *H04L 2212/00* (2013.01)

(58) Field of Classification Search
CPC combination set(s) only.
See application file for complete search history.

(56) References Cited

U.S. PATENT DOCUMENTS

| | | | |
|---|---|---|---|
| 9,749,231 B2 | 8/2017 | Duda et al. | |
| 9,755,853 B2 | 9/2017 | Berman et al. | |
| 2004/0264484 A1* | 12/2004 | Kui | H04L 43/0817 370/402 |
| 2010/0254397 A1* | 10/2010 | Nishi | H04L 41/12 370/401 |
| 2016/0380893 A1* | 12/2016 | Chopra | H04L 43/12 370/392 |
| 2017/0070412 A1* | 3/2017 | Kanevsky | H04L 43/0811 |
| 2017/0374101 A1 | 12/2017 | Woolward et al. | |
| 2018/0013687 A1 | 1/2018 | Jin et al. | |
| 2020/0145316 A1* | 5/2020 | Sosthene Enguehard | H04L 45/02 |

* cited by examiner

*Primary Examiner* — Yee F Lam
(74) *Attorney, Agent, or Firm* — G. E. Ehrlich

(57) ABSTRACT

Methods, systems and software program products for configuring a virtual network port for a physical server to support packets transfer between the physical server and other network nodes in a virtual network, comprising transmitting one or more configuration Protocol Data Units (PDU) comprising extension configuration message(s) of a network management protocol to a network circuitry connecting a physical server to a network. One or more of the extension configuration message comprise one or more virtual network settings for a virtual network port mapping the physical server in a virtual network. The network circuitry is configured to deploy the virtual network port to support exchange of packets between the physical server and one or more of a plurality of nodes of the virtual network by encapsulating and de-capsulating outgoing and incoming packets according to one or more virtual network encapsulation protocols using one or more of the virtual network settings.

20 Claims, 5 Drawing Sheets

NETWORK LAYER METHOD OF CONFIGURATION OF A BARE-METAL SERVER IN A VIRTUAL NETWORK

BACKGROUND

The present invention, in some embodiments thereof, relates to configuring a virtual network port mapping a physical server in a virtual network, and, more specifically, but not exclusively, to extending a network management protocol to support configuration of a virtual network port mapping a physical server in a virtual network.

The constant increase in scale of networks, for example, in data centers, in cloud services and/or the like leads to increased reliance on virtual networking providing an abstraction layer over one or more networks to facilitate full software control over the network thus enabling simple and highly scalable network routing structures. In fact, the capability to virtualize networks, workloads, and applications and then move them across network infrastructure gave rise to the first cloud architectures.

Applying virtual networking, logical networks which are completely decoupled from physical servers may be rapidly and easily constructed to orchestrate workloads across this logical space. This way, virtual networks may extend beyond the boundaries of a physical network. Virtual networking is further beneficial in terms of flexibility, isolation and automation facilitated by the software-based management of the network.

The virtual networking fundamentally facilitates data communication between a plurality of components virtualized in the computing environment, for example, a Virtual Private Cloud (VPC) operated by a VPC provider to serve one or more clients. Such virtualized components (nodes) may include virtual machines (VM), containers, unikernels and/or the like.

However, while the virtual network is primarily directed to provide network abstraction for the virtualized nodes, in some deployments one or more physical servers may also be included in the VPC by connecting to the virtual network. Such physical servers, specifically, client owned bare-metal servers which are deployed as part of the VPC are configured to execute under full control of the client in order to ensure privacy, segregation (isolation) and security of the client owned physical server.

SUMMARY

According to a first aspect of the present invention there is provided a method of configuring a virtual network port for a physical server to support packets transfer between the physical server and other network nodes in a virtual network, comprising using one or more processors for transmitting one or more PDUs comprising one or more extension configuration messages of a network management protocol to a network circuitry connecting a physical server to a network. One or more of the extension configuration message comprise one or more virtual network settings for a virtual network port mapping the physical server in a virtual network. The network circuitry is configured to deploy the virtual network port to support exchange of packets between the physical server and one or more of a plurality of nodes of the virtual network by encapsulating and de-capsulating outgoing and incoming packets according to one or more virtual network encapsulation protocols using one or more of the virtual network settings.

According to a first aspect of the present invention there is provided a system for configuring a virtual network port for a physical server to support packets transfer between the physical server and other network nodes in a virtual network, comprising one or more processors executing a code. The code comprising code instructions to transmit one or more configuration PDUs comprising one or more extension configuration messages of a network management protocol to a network circuitry connecting a physical server to a network. One or more of the extension configuration messages comprise one or more virtual network settings for a virtual network port mapping the physical server in a virtual network. The network circuitry is configured to deploy the virtual network port to support exchange of packets between the physical server and one or more of a plurality of virtual nodes of the virtual network by encapsulating and de-capsulating outgoing and incoming packets according to one or more virtual network encapsulation protocols using one or more of the virtual network settings.

According to a third aspect of the present invention there is provided a computer program product for configuring a virtual network port for a physical server to support packets transfer between the physical server and other network nodes in a virtual network, comprising a non-transitory computer readable storage medium and a first program instructions for transmitting one or more configuration PDUs comprising one or more extension configuration messages of a network management protocol to a network circuitry connecting a physical server to a network. One or more of the extension configuration messages comprise one or more virtual network settings for a virtual network port mapping the physical server in a virtual network. The network circuitry is configured to deploy the virtual network port to support exchange of packets between the physical server and one or more of a plurality of virtual nodes of the virtual network by encapsulating and de-capsulating outgoing and incoming packets according to one or more virtual network encapsulation protocols using one or more of the virtual network setting. Wherein the first program instructions are executed by one or more processors from the non-transitory computer readable storage medium.

In a further implementation form of the first, second and/or third aspects, the virtual network is at least part of a Virtual Private Cloud (VPC).

In a further implementation form of the first, second and/or third aspects, the virtual network encapsulation protocols comprise one or more members of a group consisting of: Virtual Extensible Local Area Network (VXLAN), Network Virtualization using Generic Routing Encapsulation (NVGRE) and Generic Network Virtualization Encapsulation (GENEVE) and Stateless Transport Tunneling (STT).

In a further implementation form of the first, second and/or third aspects, the network management protocol is Simple Network Management Protocol (SNMP) applied in the control plane of the virtual network. One or more of the extension configuration messages comprising one or more extension Management Information Base (MIB) objects appended to the SNMP protocol to support delivery of one or more or more of the virtual network setting.

In a further implementation form of the first, second and/or third aspects, the network management protocol is Network Configuration Protocol (NETCONF) applied in the control plane of the virtual network. One or more of the extension configuration messages comprising one or more extension YANG objects appended to the NETCONF protocol to support delivery of one or more of the virtual network setting.

In a further implementation form of the first, second and/or third aspects, the virtual network settings comprise one or more members of a group consisting of: a virtual network address assigned to the virtual network port deployed to map a network port of the physical server in a range of virtual addresses of the virtual network, a virtual network identifier (VNID) of the virtual network, a VPC identifier (VPC ID), a security group association for the physical server and a multicast group association for the physical server.

In a further implementation form of the first, second and/or third aspects, the virtual network address defines an Internet Protocol (IP) address assigned to the virtual network port in the range of IP addresses of the virtual network, the virtual network port applies the IP address for the encapsulation and de-capsulation.

In an optional implementation form of the first, second and/or third aspects, the virtual network address defines a Media Access Control (MAC) address assigned to the virtual network port, the virtual network port applies the IP address and the MAC address for the encapsulation and de-capsulation.

In an optional implementation form of the first, second and/or third aspects, the virtual network port responds with one or more extension response messages of the network management protocol to indicate a status of the virtual network port.

In a further implementation form of the first, second and/or third aspects, each of the packets exchanged between the physical server and one or more of the nodes of the virtual network is a member of a group consisting of: a unicast packet, a multicast packet and a broadcast packet.

In a further implementation form of the first, second and/or third aspects, the network circuitry is utilized by a network switch connecting one or more network ports of the physical server to the network such that the virtual network port is deployed in the network switch to apply the encapsulation and de-capsulation.

In a further implementation form of the first, second and/or third aspects, the network circuitry is utilized by a Network Interface Card (NIC) of the physical server such that the virtual network port is deployed in the NIC to apply the encapsulation and de-capsulation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
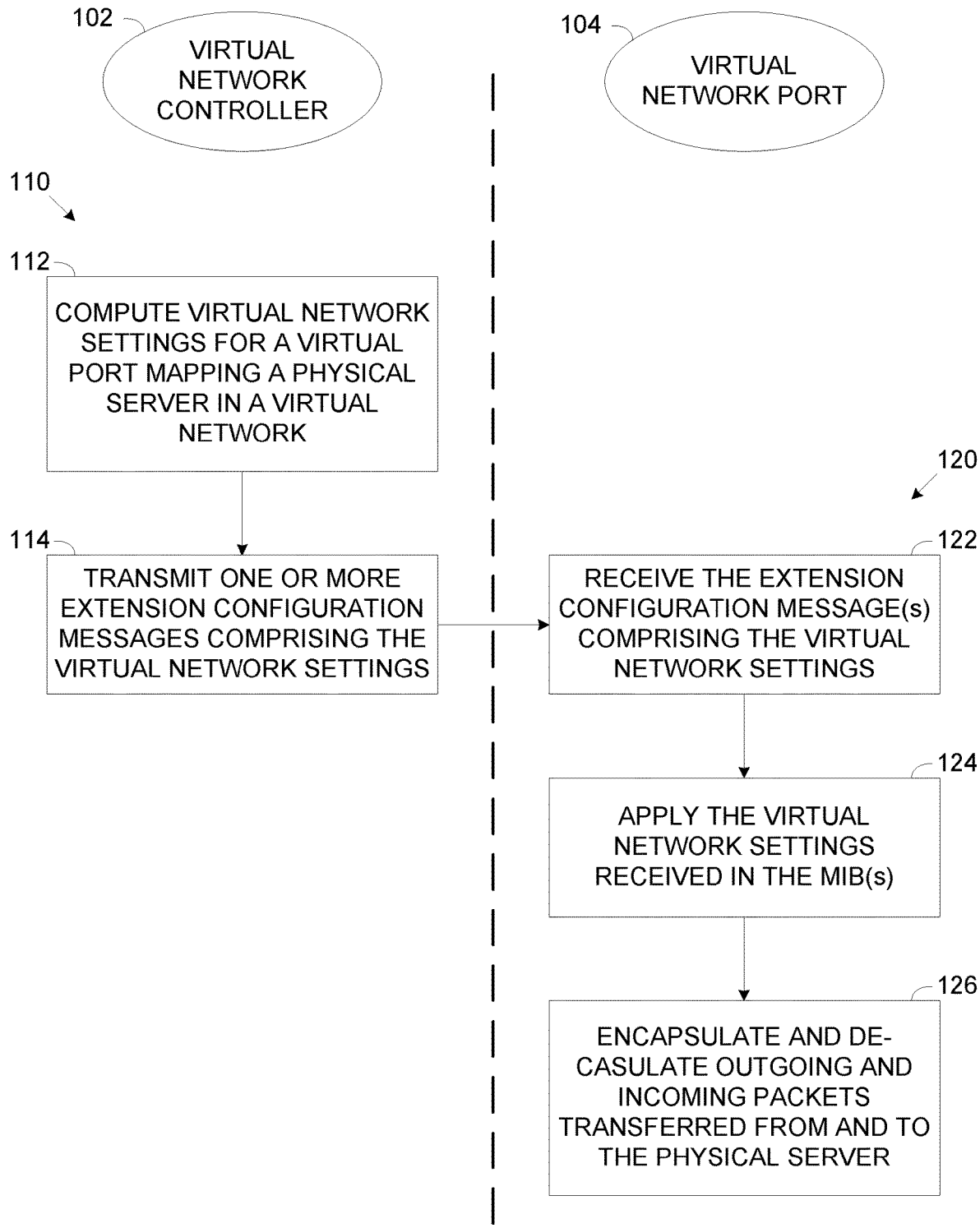
FIG. 1 presents flow charts of exemplary processes of transferring virtual network settings to a virtual network port mapping a physical server in a virtual network to support packets transfer between the physical server and other nodes connected to the virtual network, according to some embodiments of the present invention.

The present invention, in some embodiments thereof, relates to configuring a virtual network port mapping a physical server in a virtual network, and, more specifically, but not exclusively, to extending a network management protocol to support configuration of a virtual network port mapping a physical server in a virtual network. Configuration of the virtual network port is done using one or more network management protocols extended to support delivery of virtual network settings assigned to the virtual network port. Such network management protocols may include, for example, Simple Network Management Protocol (SNMP), Network Configuration Protocol (NETCONF) and/or the like.

According to some embodiments of the present invention, there are provided methods, systems and computer program products for configuring a virtual network port deployed to map a physical server in a virtual network, in order to support exchange of data packets over the virtual network between the physical server and one or more of a plurality of network nodes of the virtual network.

The virtual network, for example, a Software Defined Network (SDN) may provide a logical network abstraction over a physical network to connect the plurality of network nodes which may include, for example a virtual machine, a virtual router, a virtual router interface, a physical host mapped through a virtual endpoint, a physical router mapped through a virtual endpoint, a container, a unikernel, a virtual interface mapping one or more virtual and/or hardware resources and/or the like. The virtual network may constitute at least part of a Virtual Private Cloud (VPC) operated by a VPC provider to serve one or more clients.

The network nodes of the virtual network apply one or more of a plurality of virtual network virtualization and/or tunneling protocols for constructing and using virtual domain over the virtual network. For example, the network nodes may employ one or more virtual network encapsulation protocols to exchange data packets among them, for example, Virtual Extensible LAN (VXLAN), Network Virtualization using Generic Routing Encapsulation (NVGRE), Generic Network Virtualization Encapsulation (GENEVE), Stateless Transport Tunneling (STT) and/or the like.

The physical server, specifically, a client owned bare-metal server which may be deployed as part of the VPC typically must not execute VPC provider software components in order to ensure privacy, segregation (isolation) and security of the client owned physical server. Since VPC provider software components must not be executed by the physical server, in particular for implementing the virtual network connectivity, the physical server is thus incapable of directly communicating with the network nodes over the VPC defined virtual network using the virtual network virtualization protocol(s).

The virtual network port may be therefore deployed to map the physical server in the virtual network and support transmission of data packets (e.g. unicast packets, multicast packets and/or broadcast packets) from the physical server to the virtual network node(s) and/or reception of packets from the virtual network node(s) at the physical server. To this end, the virtual network port may encapsulate outgoing packets (egress traffic) transmitted from the physical server according to the virtual network encapsulation protocols used by the virtual network nodes. On the ingress path, the virtual network port may de-capsulate incoming packets received from one or more of the virtual network nodes which are destined for the physical server.

However, since privacy, segregation and security of the client owned physical server may not be compromised by executing VPC provider software components, the virtual network port may not be deployed on the physical server itself, specifically not within the execution environment of the physical server serving the client.

In order to enable connectivity of the physical server to the virtual network while maintaining the privacy of the client's execution environment, the virtual network port may be deployed in one or more network circuitries connecting the physical server to the network on which the virtual network is deployed. These network circuitry(s) comprise one or more processing units and are capable of executing one or more software modules optionally supported by one or more hardware elements to instrument the virtual network port. As the network circuitry on which the virtual network port is deployed uses its own processing resources, the execution environment of the network circuitry is completely separated from the execution environment of the physical server. The execution environment of the physical server is therefore isolated from the execution environment of the network circuitry thus ensuring the privacy, segregation and security of the client. For example, the virtual network port may be deployed in a switch connecting the physical server to the network. In another example, the virtual network port may be deployed in a network interface, for example, a Network Interface Controller (NIC) of the physical server which connects the physical server to the switch. In particular, the virtual network port may be deployed in an enhanced network interface comprising sufficient processing and memory resources for realizing the virtual network port.

In order to process the packets exchanged between the physical server and the virtual network node(s) according to the virtual network virtualization and/or tunneling protocols used by the virtual network nodes, the virtual network port must apply one or more virtual network settings specific to the virtual network and uniquely identifying the virtual network port. These virtual network settings may include, for example, a Virtual Network identifier (VNID), a VPC identifier (VPC ID), an Internet Protocol (IP) address assigned to the virtual network port in a range of IP addresses defined for the virtual network, a Media Access Controller (MAC) assigned to the virtual network port which is unique in the virtual network, a security group (SG) association of the physical server in the virtual network and/or the like.

The virtual network port deployed to connect the physical server to the virtual network is not inherently controlled by one or more virtual network controllers, for example, an SDN controller and/or the like deployed and executed to configure, control, manage and/or monitor the virtual network. This is since as described herein above, the VPC provider may not deploy software components on the physical server since such software components may intentionally and/or unintentionally violate the privacy, security and isolation of the client. The virtual network controller therefore needs to transmit the virtual network settings to the virtual network port.

In order to support high scalability (to support multiple virtual network ports), reduce complexity and/or support legacy networking equipment, the virtual network controller may transmit the virtual network settings to the virtual network port using one or more network management protocols commonly used in most if not all network infrastructures and are hence supported by most of the existing networking equipment. Such network management protocols may include, for example, SNMP, NETCONF and/or the like.

In particular, the network management protocol(s) may be extended to support delivery of the virtual network settings to the virtual network port. For example, one or more extension configuration messages may be added to the network management protocol(s) to enable delivery of the virtual network settings from the virtual network controller(s) to the virtual network port. Moreover, one or more extension response messages may be added to the network management protocol(s) to enable the virtual network port to respond with status indication, for example, success and/or failure to apply the virtual network settings, success and/or failure to properly deploy the virtual network port and/or the like. For example, in case of the SNMP protocol, one or more Management Information Base (MIB) objects may be added to extend the SNMP protocol to support delivery of the virtual network settings and optionally for supporting the response indications. In another example, in case of the NETCONF protocol, one or more YANG objects may be added to extend the NETCONF protocol to support delivery of the virtual network settings and optionally for supporting the response indications.

The virtual network controller(s) may transmit one or more of the extension configuration messages comprising the virtual network settings to the network circuitry configured to deploy the virtual network port. The network circuitry may apply the virtual network settings extracted from the configuration message(s) to deploy the virtual network port mapping the physical server in the virtual network. The network circuitry may optionally respond to the virtual network controller(s) with one or more of the extension response messages to indicate a status of the deployed virtual network port.

After properly deployed, the virtual network port may encapsulate and de-capsulate the outgoing packets and incoming packets respectively according to the virtual network encapsulation protocols using the virtual network settings assigned to the virtual network port.

Configuring and deploying the virtual network port in the switch and/or in the enhanced network interface of the physical server to map the physical server in the virtual network may present significant advantages compared to currently existing methods and systems for connecting physical servers to virtual networks.

Connecting the physical server, in particular the client owned bare-metal server to the virtual network may be highly desirable and in many cases essential for a plurality of applications, for example, connecting the bare-metal server which is under full control of the client to a VPC operated by the VPC provider to serve the client.

Some of the existing methods for connecting physical servers to virtual networks may include deploying on the physical server a virtualization layer for instrumenting a virtual network component (e.g. a virtual switch) which is owned and controlled by the provider of the virtual network, i.e. the VPC provider and exposing a single virtual server to the client, in place of a client owned physical server. This solution may be simple and highly aligned with the virtual network architecture applied in the VPC which thus views the physical server as any other virtual node. However, this approach may significantly compromise the client owned physical server service provided to the client who is not in full control of the execution environment of the physical server. In contrast, deploying the virtual network port in the switch and/or in the enhanced network interface of the physical server which maintain a completely separate execution environment does not impact, affect and/or compromise the execution environment of the physical server which is entirely under control of the client (the single tenant).

Other exiting methods may include deploying the virtual network port in the enhanced network interface (Smart NIC) of the physical server where the Smart NIC having its own full execution environment (processor(s), memory resources, connection to a control network) that is fully controlled by the provider of the virtual network, i.e. the VPC provider, over the control interface invisible to the client. This solution may also be highly aligned with the virtual network architecture applied in the VPC. However, in order to support (remote) control over the Smart NIC, the Smart NIC may be significantly complex and hence costly in terms of development and/or production. On the other hand, the virtual network port deployed on the physical switch or on the enhanced network interface of the physical server according to the present invention is configured using standard and commonly used network management protocols (e.g. SNMP. NETCONF) extended to support the delivery of the virtual network settings to the virtual network port. These network management protocols are inherently extensible and therefore present an insignificant effort to extend with the extension configuration and optionally the extension response objects. As standard networking equipment, for example, the enhanced network interface of the physical server and physical switches support these network management protocols, no special capabilities, features and/or functionality needs to be implemented in the enhanced network interface thus making it significantly simple and low cost.

Other existing methods may include deploying the virtual network port in the switch connecting the physical server to the network where, in order to setup up the virtual network port, the switch is configured and/or managed via the physical network domain typically using vendor specific protocols and is not controlled by the virtual network controller. This solution may be significantly simple to apply as currently some existing switches are capable of supporting virtual network ports. This solution is also fully transparent to the client (single tenant), i.e. to the physical server hosting the single tenant and thus ensures full privacy, segregation and security of the client. This approach however may present significant limitations. First, configuring and/or managing the switch needs to be in the physical network domain rather than in the virtual network domain and thus may break the virtual network architecture. Moreover, the deployment implementation of virtual network ports in switches may be specific to each switch vendor thus presenting a major scalability and vendor lock-in limitations. This is in contrast to the virtual network port deployment according to the present invention which employs the standard and commonly used network management protocols (e.g. SNMP, NETCONF) which are supported by most switches regardless of the vendor. Scalability is therefore significantly increased and vendor lock-in is avoided since practically any switch from any vendor may be used to obtain virtual network port configuration from the VPC controller and configure the virtual network port.

There may be deployments in which it may be possible to deploy the virtual network port on another server connected to the physical server, for example, a virtual network proxy server. Such deployments may naturally not require using the virtual network port deployment according to the present invention since the proxy server may be under control of the VPC provider and may be therefore accessible and configurable by the VPC provider using standard methods as known in the art. However, this approach has drawbacks as it adds an extra network hop for the communication traffic exchanged between the physical server and the nodes of the virtual network and may thus cause significant performance degradation, defying one of the original purposes of connecting the bare-metal physical server to the VPC, namely fast dedicated network connection to/from the bare-metal physical server. Another limitation of this approach is the need to allocate additional resources, specifically the proxy server resources for connecting the physical server to the virtual network which may have a significant cost impact.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the figures, FIG. 1 presents flow charts of exemplary processes of transferring virtual network settings to a virtual network port mapping a physical server in a virtual network to support packets transfer between the physical server and other nodes connected to the virtual network, according to some embodiments of the present invention.

Exemplary processes 110 and 120 may be executed to transfer one or more virtual network settings to a virtual network port 104 deployed to map a physical server in a virtual network, for example, an SDN providing a logical network abstraction over a physical network. The virtual network port 104 is deployed to support packets transfer between the physical server and one or more network nodes connected to the virtual network, e.g. by encapsulating and de-capsulating outgoing and incoming packets according to one or more virtual network encapsulation protocols applied by the network nodes of the virtual network, for example, VXLAN, NVGRE, GENEVE, STT and/or the like.

The virtual network may constitute at least part of a VPC which may comprise a plurality of virtual networks each comprising a plurality of network nodes which apply one or more of the virtual network encapsulation protocols to exchange data packets among them. The physical server, for example, a client owned bare-metal server may be deployed as part of the VPC. However, the physical server, specifically the bare-metal server may have no provider-controlled virtualization layer and is thus incapable of directly connecting to the virtual network to communicate with the virtual network nodes employing the virtual network encapsulation protocol(s).

The process 110 may be executed, for example, by a virtual network controller 102 to transfer the virtual network settings, for example, VNID, VPC ID, IP address, MAC address, security group (SG) association of the physical server and/or the like to the virtual network port 104. The virtual network controller 102 may transmit the virtual network settings in one or more extension configuration messages of one or more network management protocols, for example, SNMP, NETCONF and/or the like. The extension configuration message(s) may include one or more extension objects added to extend the network management protocol(s) to support delivery of the virtual network settings.

The process 120 may be executed by the virtual network port 104 to exchange packets between the physical server and one or more of the network nodes of the virtual network, according to one or more virtual network virtualization and/or tunneling protocols, for example, encapsulation protocols using the received virtual network settings. In particular, the virtual network port 104 may encapsulate packets transmitted from the physical server to the virtual network node(s) and de-capsulate packets received from virtual network node(s) which are directed to the physical server.

Figure 2A:
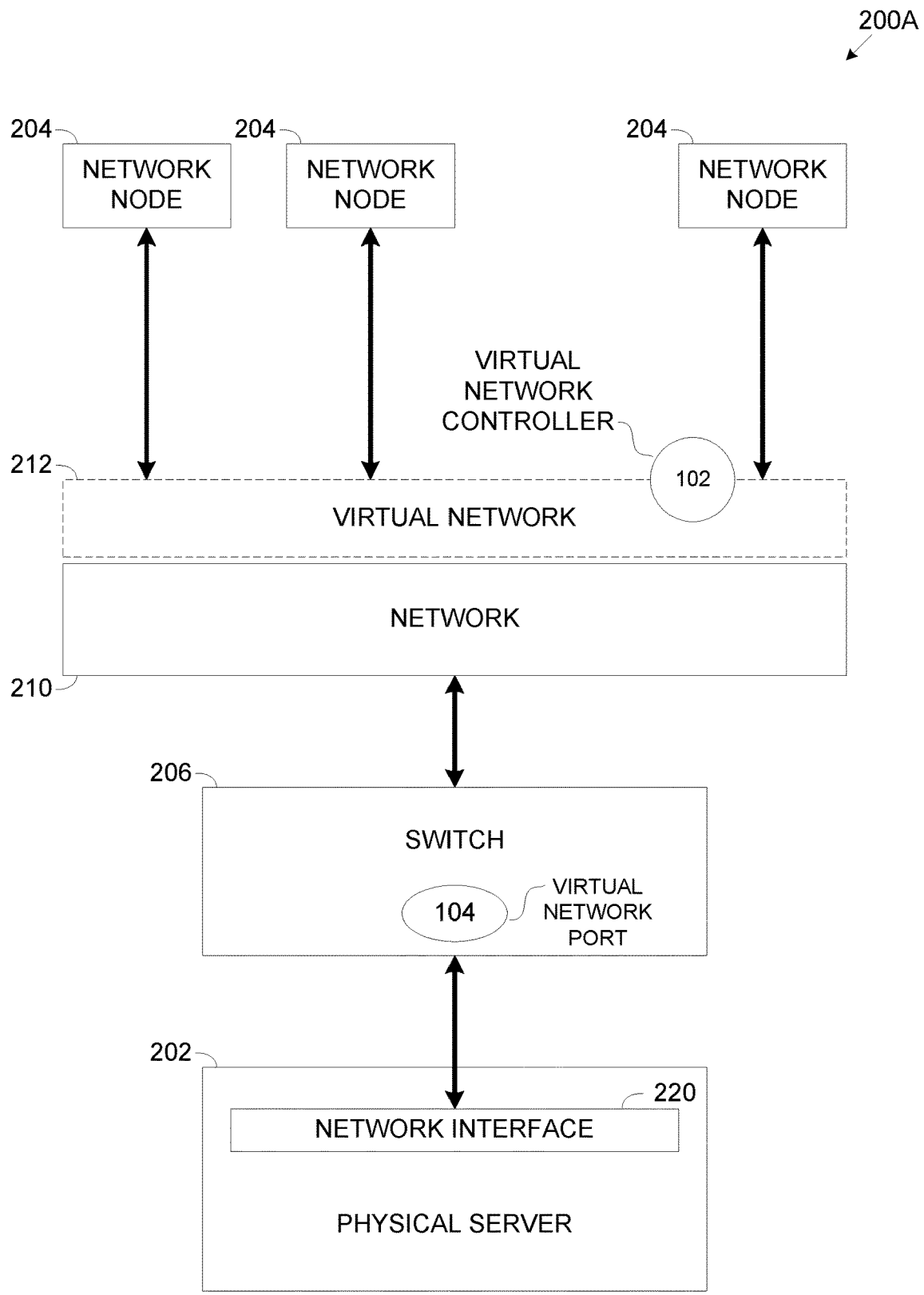
FIG. 2A and FIG. 2B are schematic illustrations of exemplary embodiments of a system for transferring virtual network settings to a virtual network port mapping a physical server in a virtual network to support packets transfer between the physical server and other nodes connected to the virtual network, according to some embodiments of the present invention.
Figure 2B:
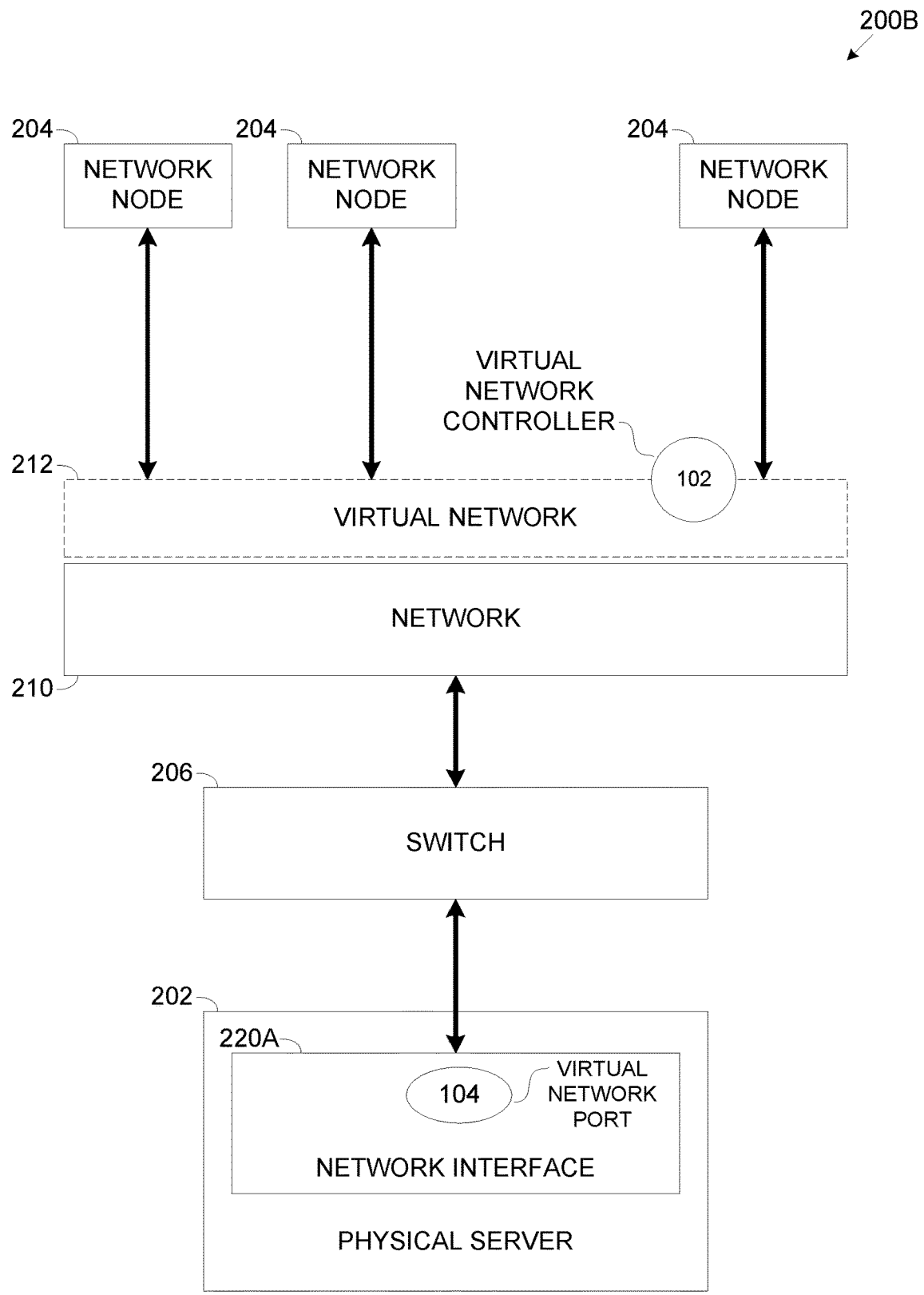

Reference is also made to FIG. 2A and FIG. 2B, which are schematic illustration of exemplary embodiments of a system for transferring virtual network settings to a virtual network port mapping a physical server in a virtual network to support packets transfer between the physical server and other nodes connected to the virtual network, according to some embodiments of the present invention.

Exemplary networked systems 200A and/or 200B may each include a physical server 202 connected via a switch 206 to a network 210, for example, a Local Area Network (LAN), a Wide Area Network (WAN), a Metropolitan Area Network (MAN) and/or the like. The physical server 202 may connect to the switch 206 using a network interface 220, for example, a NIC and/or the like supporting connectivity to one or more networks.

A virtual network 212 provides a logical network abstraction over the physical network 210. In particular, the network 210 may be part of an infrastructure of a data center hosting a one or more VPCs. A virtual network 212, for example, an SDN providing a logical network abstraction over the physical network 210 may constitute at least part of a VPC comprising a plurality of network nodes 204, for example, a virtual machine, a virtual router, a virtual router interface, a physical host mapped through a virtual endpoint, a physical router mapped through a virtual endpoint, a container, a virtual interface mapping one or more virtual and/or hardware resources and/or the like.

One or more of the network nodes 204 comprising one or more processors, memory resources for program and/or data store may execute one or more software modules, for example, a process, a script, an application, an agent, a utility, a tool, an Operating System (OS), a service, a plug-in, an add-on and/or the like. Each of the software modules comprises a plurality of program instructions which may be executed by the processor(s) of the network node(s) 204 from the respective program store. In particular, one or more of the network nodes 204 may execute a virtual network controller 102 to configure, control and/or monitor the virtual network 212. For example, in case of the SDN, one or more instances of an SDN controller may be executed by one or more of the network nodes 204 for configuring, controlling and/or monitoring the SDN.

The switch 206 connecting the physical server 202 to the network 210 may be regarded as an edge switch since it is located at the edge of the virtual network 212 with respect to the physical server 202.

According to some embodiments of the present invention, as shown in the system 200A, the switch 206 may be configured to deploy the virtual network port 104. The switch 206 may comprise one or more processors and memory resources for program and/or data store for executing one or more software modules each comprising a plurality of program instructions which may be executed by the processor(s) of the switch 206 from the program store of the switch 206. The switch 206 may further include one or more hardware elements, for example, a circuit, a component, an Integrated Circuit (IC), an Application Specific Integrated Circuit (ASIC), a Field Programmable Gate Array (FPGA), a Digital Signals Processor (DSP) and/or the like. The virtual network port 104 executed by the switch 206 for exchanging data packets between the physical server 202 and the network nodes 204 of the virtual network 212 may be therefore realized, implemented and/or executed using one software modules, hardware elements and/or a combination thereof.

According to some embodiments of the present invention, as shown in the system 200B, the network interface 220 may be configured to deploy the virtual network port 104. In particular, the network interface 220 may be an enhanced network interface 220A comprising sufficient processing resources, memory resources and networking resources for instrumenting the virtual network port 104 by processing of data packets exchanged between the physical server 202 and the network nodes 204 of the virtual network 212 according to one or more virtualization protocols employed by the network nodes 204. The enhanced network interface 220A may utilize one or more hardware elements for executing the process 120, for example, a circuit, a component, an IC, an ASIC, an FPGA, a SP and/or the like. The enhanced network interface 220A may optionally comprise one or more processors and memory resources for program and/or data store for executing one or more software modules each comprising a plurality of program instructions which may be executed by the processor(s) of the enhanced network interface 220A from the program store of the enhanced network interface 220A. The virtual network port 104 executed by enhanced network interface 220A may be therefore realized, implemented and/or executed using one software modules, hardware elements and/or a combination thereof. It should be noted that the execution environment of the enhanced network interface 220A is completely separated from the execution environment of the physical server 202 such that there is complete isolation between the two execution environments. The execution environment of the physical server 202 which may be under control of the client is therefore not violated and/or compromised.

As shown at 112, the virtual network controller 102, for example, the SDN controller computes one or more virtual network settings for the virtual network port 104 deployed to map the physical server 202 in the virtual network 212, for example, a VNID, a VPC ID, an IP address, a MAC address, one or more SG (security group) settings associated with the physical server 202 and/or the like.

The virtual network controller 102 may compute the virtual network settings to comply with the settings of the virtual network 212. For example, the VNID assigned by the virtual network controller 102 to the virtual network port 104 is the identifier (ID) of the virtual network 212. In another example, as the virtual network 212 may be part of a VPC, the VPC ID assigned by the virtual network controller 102 to the virtual network port 104 is the identifier (ID) of the VPC. In another example, the IP address assigned by the virtual network controller 102 to the virtual network port 104 is in a range of IP addresses of the virtual network 212, i.e. within the range of IP addresses assigned to the network nodes 204. In another example, the MAC address assigned by the virtual network controller 102 to the virtual network port 104 is a unique MAC in the virtual network 212, i.e. different from the MAC addresses of all the network nodes 204.

As shown at 114, the virtual network controller 102 transmits the virtual network settings via the network 210 to the network circuitry which is configured to deploy the virtual network port 104, for example, the (edge) switch 206 and/or the enhanced network interface 220A.

The virtual network controller 102 may transmit the virtual network settings in one or more extension configuration messages of one or more network management protocols used to manage, configure and/or control the network 210, for example, SNMP, NETCONF and/or the like. The extension configuration message(s) are specifically defined to encode the virtual network settings and are appended to extend the network management protocol(s) to support delivery of the virtual network settings. For example, in case of the SNMP protocol, the extension configuration message(s) may include one or more extension MIB objects added to the SNMP protocol to support delivery of the virtual network settings. For example, in case of the NETCONF protocol, the extension configuration message(s) may include one or more extension YANG objects added to the NETCONF protocol to support delivery of the virtual network settings. Each of the configuration messages may be transmitted in one or more data PDUs over the network 210.

Complementary, the receiving network circuitry configured to deploy the virtual network port 104 (i.e. the switch 206 and/or the enhanced network interface 220A) is further configured to receive, decode, process and apply the extension MIB(s) encoding the virtual network settings assigned for the virtual network port 104.

Transmission of the extension configuration message(s) encoding the virtual network settings from the virtual network controller 102 to the network circuitry configured to deploy the virtual network port 104 may depend on the specifics of the implementation. For example, assuming the virtual network port 104 is deployed in the (edge) switch 206 connecting the physical server 202 to the network 210. In such case the virtual network controller 102 may include a network management protocol engine and/or use a network management protocol engine of the network node 204 executing the virtual network controller 102 to encode the extension configuration message(s) and/or extension object(s) and transmit them over the network 210 to the switch 206. In another example, assuming the virtual network port 104 is deployed in the (edge) enhanced network interface 220A used by the physical server 202 to connect to the switch 206. In such case the virtual network controller 102 may use a control plane of the virtual network 212 to transmit the virtual network settings to the switch 206. The switch 206 in turn may encode the received virtual network settings in one or more extension configuration message(s) and/or extension object(s) using its own network management protocol engine and transmit the extension configuration message(s) to the enhanced network interface 220A.

Moreover, the extension configuration message(s) may be configured, constructed and/or encoded according to one or more of the virtual network encapsulation protocols applied in the virtual network 212 and which the network circuity deploying the virtual network port 104 is therefore also configured to support. For example, assuming the VXLAN protocol is used in the virtual network 212, the extension configuration messages may include SNMP extension MIB objects defined to extend the VXLAN encapsulation protocol.

As shown at 122, the network circuity deploying the virtual network port 104 (i.e. the switch 206 and/or the enhanced network interface 220A), in particular the virtual network port 104 executed by the network circuitry receives the extension configuration message(s) encoding the virtual network settings assigned to the virtual network port 104 for mapping the physical server 202 in the virtual network 212. The virtual network port 104 may decode the received extension configuration message(s) to extract the encoded virtual network settings. In particular, the virtual network port 104 may be configured to support the virtual network encapsulation protocol(s) used in the virtual network 212 including the extension configuration messages appended to the VXLAN encapsulation protocol. The virtual network port 104 may therefor de-capsulate the received extension configuration message(s) to extract the encoded virtual network settings.

A shown at 124, the virtual network port 104 may apply the received virtual network settings for mapping the physical server 202 in the virtual network 212 to support data packets transfer between the physical server 202 and the network nodes 204. For example, the virtual network port 104 may update the virtual network settings in one or more data plane mapping records, for example, a routing table, a routing map, a memory, a database and/or the like used by the network circuitry to resolve source and/or destination addresses for transmitted and/or received packets.

The virtual network port 104 may respond to the virtual network controller 102 by transmitting one or more extension response messages to indicate status of the virtual network port 104 deployed to map the physical server 202 in the virtual network 212. For example, the virtual network port 104 may transmit one or more of the extension response messages indicating that the virtual network settings are applied in the network circuitry and the virtual network port 104 is successfully deployed to support packets exchange between the physical server 202 and the network nodes 204 over the virtual network 212. In another example, the virtual network port 104 may transmit one or more extension response messages indicating that the virtual network port 104 failed to deploy properly.

Based on the extension response message(s), the virtual network controller 102 may validate the successful or failed deployment of the virtual network port 104 and hence the mapping status of the physical server 202 in the virtual network 212. The virtual network controller 102 may further forward the extension response message(s) to one or more high level protocols which may further process the extension response message(s) in order to identify the deployment status of the virtual network port 104 and/or determine whether and/or which further action is required.

As shown at 126, after applying the virtual network settings, the virtual network port 104 may exchange packets between the physical server 202 and one or more of the network nodes 204 over the virtual network 212 by processing outgoing and incoming packets according to one or more of the virtual network virtualization protocols using one or more of the virtual network settings. The processing of the data packets may include, for example, encapsulation and de-capsulation, packet filtering, implicit packets routing, "arp" responding and more. For example, the virtual network port 104 may encapsulate and de-capsulate outgoing and incoming packets according to one or more of the virtual network encapsulation protocols using one or more of the virtual network settings. As such, the virtual network port 104 may encapsulate one or more data packets, for example, a unicast packet, a multicast packet and/or a broadcast packet transmitted from the physical server 202 transmitted to one or more of the network nodes 204 in one or more encapsulation packets compliant with the virtual network encapsulation protocol used in the virtual network 212, for example, VXLAN, NVGRE, GENEVE, STT and/or the like. Complementary, the virtual network port 104 may de-capsulate one or more encapsulation packets received from one or more of the network nodes 204, for example, a unicast packet, multicast packet and/or broadcast packet and forward the extracted packet(s) to the physical server 202.

For example, the virtual network port 104 may encapsulate a packet transmitted by the physical server 202 in one or more encapsulation packets having a header complying with the virtual network encapsulation protocol used in the virtual network 212, for example, VXLAN. The header may naturally include the VNID of the virtual network 212. The header may further include the source IP address (i.e. the IP address assigned to the virtual network port 104) and the IP address of a destination network node 204 to which the packet is transmitted. In case the virtual network 212 is at least part of a VPC, the virtual network port 104 may include the VPC ID of the VPC in the header of the encapsulation packet(s). Optionally, the virtual network port 104 includes the source MAC address (i.e. the MAC address assigned to the virtual network port 104) and the MAC address of the destination network node. In another example, the virtual network port 104 may include the security group association of the physical server 202 in the header of the encapsulation packet(s) in order to comply with the security controls applied in the virtual network 212, typically security controls of the VPC.

Figure 3:
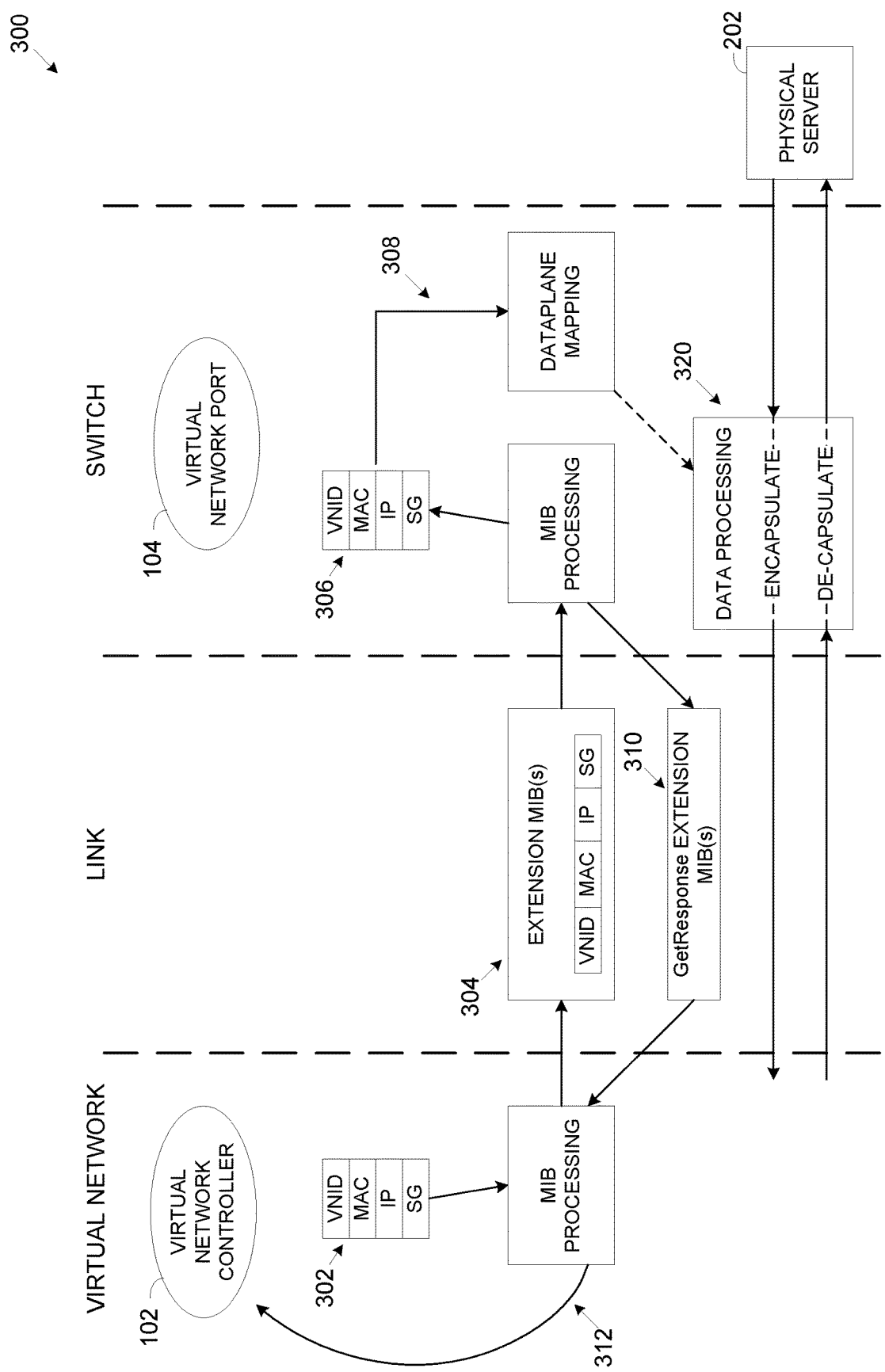
FIG. 3 is an exemplary sequence for providing virtual network settings to a virtual network port deployed in a switch for mapping a physical server in a virtual network to support packets transfer between the physical server and other nodes connected to the virtual network, according to some embodiments of the present invention.

Reference is now made to FIG. 3, which is a sequence for providing virtual network settings to a virtual network port deployed in a switch for mapping a physical server in a virtual network to support packets transfer between the physical server and nodes connected to the virtual network, according to some embodiments of the present invention. An exemplary sequence 300 depicts the path of the virtual network settings transmitted to a switch such as the switch 206 according to the process 110 for configuring a virtual network port such as the virtual network port 104 deployed in the switch 206 to map a physical server such as the physical server 202 in a virtual network such as the virtual network 212 as shown in system 200A.

A virtual network controller such as the virtual network controller 102 may compute 302 one or more of the virtual network settings assigned to the virtual network port 104 mapping the physical server 202 as described in step 112 of the process 110. The virtual network settings may include, for example, the VNID of the virtual network 212, a MAC address assigned to the virtual network port 104, an IP address virtual network port 104 and SG settings for associating the physical server 202 with security groups in the virtual network 212.

The virtual network controller 102 may encode the virtual network settings in one or more extension configuration messages transmitted in one or more PDUs to the switch 206 as described in step 114 of the process 110. For example, assuming the network management protocol is SNMP, the virtual network controller 102 may encode the virtual network settings in one or more extension MIBs 304 which the switch 206 may receive and decode using its MIB processing engine. For example, assuming the virtual network encapsulation protocol used in the virtual network 212 is VXLAN, the virtual network controller 102 may encode the virtual network settings in one or more VXLAN extension MIBs, for example, an SNMP VXLAN SetRequest MIB and/or the like.

The virtual network port 104 deployed (executed) in the switch 206 may receive the extension MIBs via the MIB processing engine of the switch 206. As described in step 122 of the process 120, the virtual network port 104 is configured to support the virtual network encapsulation protocol used in the virtual network 212, for example, VXLAN including the extension MIB(s) and may therefore extract 306 the virtual network settings from the VXLAN extension MIB(s), for example, the SNMP VXLAN SetRequest MIB.

The virtual network port 104 may apply 308 the virtual network settings, for example, in a data-plane mapping record of the switch 306 as described in step 124 of the process 120 in order to properly deploy the virtual network port 104 according to the virtual network settings.

The virtual network port 104 may optionally respond to the virtual network controller 102 with one or more extension response messages to indicate a status of deployment of the virtual network port 104 as described in step 124 of the process 120. In particular, to continue the SNMP example, the virtual network port 104 may respond with one or more extension response extension MIBs 310. Continuing the VXLAN example, the virtual network port 104 may encode (encapsulate) the response in one or more VXLAN extension MIBs, for example, a GetResponse SNMP VXLAN MIB and/or the like. The virtual network controller 102 may process 312 the response extension MIBs to validate the deployment of the virtual network port 104 for mapping the physical server 202 in the virtual network 212. A described in step 124 of the process 120, the virtual network controller 102 optionally propagates one or more of the response extension MIBs to one or more high level protocols which may further process the response extension MIB(s) in order to identify the deployment status of the virtual network port 104 and/or determine whether and/or which further action is required.

After the virtual network port 104 is properly deployed in the switch 206 according to the received virtual network settings, the virtual network port 104 may start transferring 320 data packets between the physical server 202 and one or more of the network nodes 204 of the virtual network 212 as described in step 126 of the process 120. In the egress path, the virtual network port 104 may receive one or more outgoing data packets (e.g. unicast packets, multicast packets and/or broadcast packets) from the physical server 202. The virtual network port 104 may encapsulate the outgoing packets in one or more encapsulation packets according to the virtual network encapsulation protocol used in the virtual network 212, for example, VXLAN using the virtual network settings assigned to the virtual network port 104.

Finally, the virtual network port 104 may transmit the encapsulation packets over the virtual network 212. In the ingress path, the virtual network port 104 may receive one or more incoming packets (e.g. unicast packets, multicast packets and/or broadcast packets) from one or more of the network nodes 204 via the virtual network 212. The virtual network port 104 may de-capsulate the incoming packets which are encapsulated according to the virtual network encapsulation protocol used in the virtual network 212, for example, VXLAN using the virtual network settings assigned to the virtual network port 104. The virtual network port 104 may then forward the data packets extracted from the encapsulation packets to the physical server 202.

Figure 4:
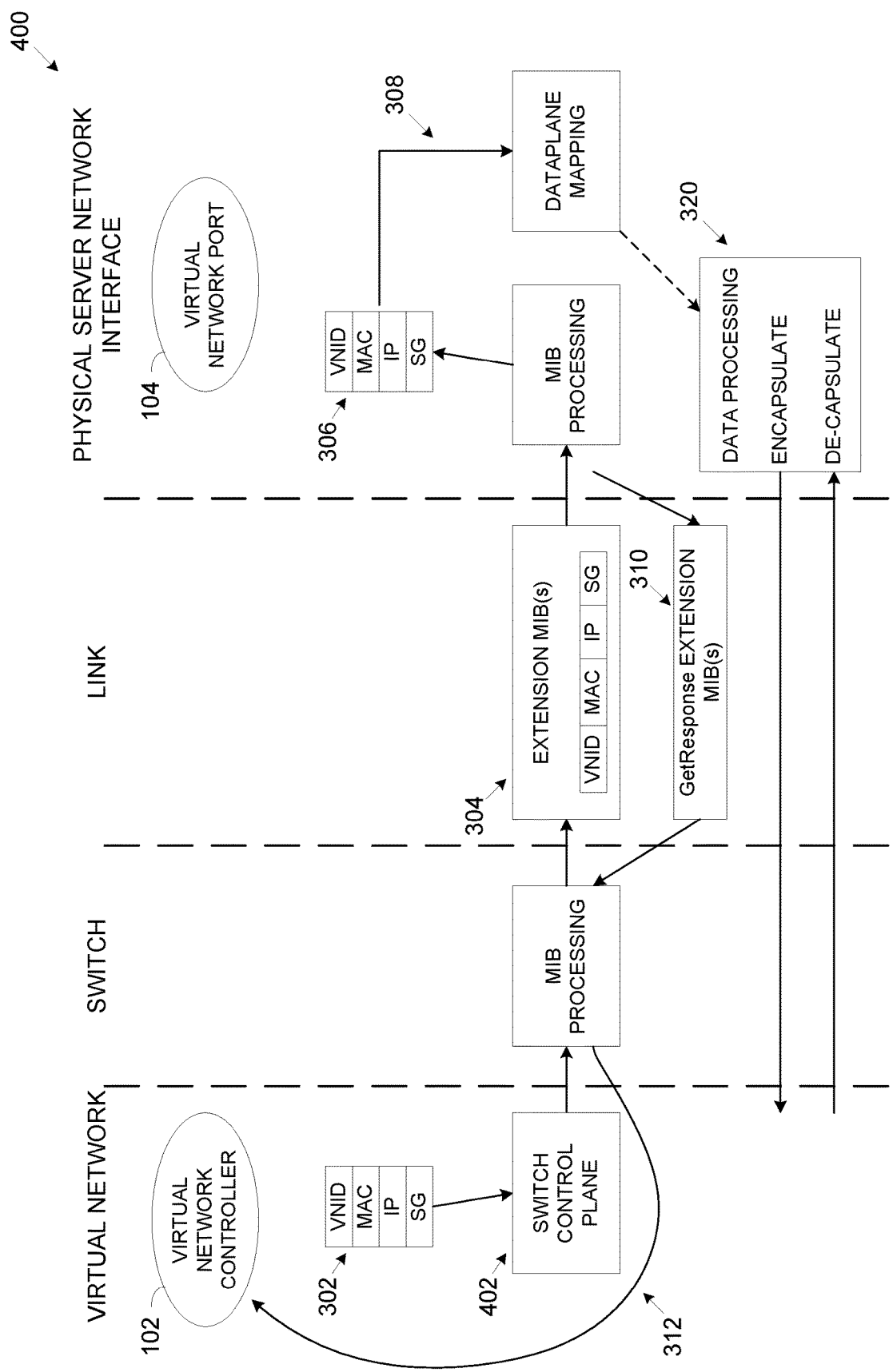
FIG. 4 is a sequence for providing virtual network settings to a virtual network port deployed in a network interface of a physical server for mapping the physical server in a virtual network to support packets transfer between the physical server and other nodes connected to the virtual network, according to some embodiments of the present invention.

Reference is now made to FIG. 4, which is a sequence for providing virtual network settings to a virtual network port deployed in a network interface of a physical server for mapping the physical server in a virtual network to support packets transfer between the physical server and other nodes connected to the virtual network, according to some embodiments of the present invention. An exemplary sequence 400 depicts the path of the virtual network settings transmitted to an enhanced network interface such as the enhanced network interface 220 according to the process 110 for configuring a virtual network port such as the virtual network port 104 deployed in the enhanced network interface 220 to map a physical server such as the a physical server 202 in a virtual network such as the virtual network 212 as shown in system 200B.

The sequence 400 is identical to the sequence 300 with the exception that the virtual network port 104 is executed by the enhanced network interface 220 and as such some minor implementation differences apply as described in the processes 110 and 120. For example, a virtual network controller such as the virtual network controller 102 may transmit the virtual network settings (assigned to the virtual network port 104) to a switch such as the switch 206 according to switch control plane 402 of the virtual network 212. From this point the sequence 400 is basically identical to the sequence 300 with the exception that the encapsulation packets encapsulated according to the virtual network encapsulation protocol(s) used in the virtual network 212, for example, VXLAN are encapsulated and de-capsulated at the enhanced network interface 220 rather than at the switch 206 as done in the sequence 300.

It is expected that during the life of a patent maturing from this application many relevant systems, methods and computer programs will be developed and the scope of the terms network virtualization methods, virtual network encapsulation protocols and network management protocols are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of configuring a virtual network port in a physical server to support packets transfer between the physical server and other network nodes in a virtual network, comprising:
 using at least one processor for:
  adding at least one extension configuration message to a network management protocol used by said virtual network and transmitting at least one configuration Protocol Data Unit (PDU) comprising said at least one extension configuration message to a network circuitry connecting the physical server to the virtual network, the at least one extension configuration message comprising at least one virtual network setting for the virtual network port mapping the physical server in the virtual network;
 wherein the network circuitry is configured to deploy the virtual network port to support exchange of packets between the physical server and at least one of a plurality of nodes of the virtual network by encapsulating outgoing packets originated by said physical server and de-capsulating incoming packets destined to said physical server, according to at least one virtual network encapsulation protocol using the at least one virtual network setting; and wherein an execution environment of said physical server is isolated from an execution environment of said virtual network port and not executing software components of the execution environment of said virtual network port for ensuring privacy.

2. The method of claim 1, wherein the virtual network is at least part of a Virtual Private Cloud (VPC).

3. The method of claim 1, wherein the physical server is a bare-metal server deployed as part of a Virtual Private Cloud (VPC).

4. The method of claim 1, wherein the at least one virtual network encapsulation protocol is a member of a group consisting of: Virtual Extensible Local Area Network (VXLAN), Network Virtualization using Generic Routing Encapsulation (NVGRE), Generic Network Virtualization Encapsulation (GENEVE) and Stateless Transport Tunneling (STT).

5. The method of claim 1, wherein the network management protocol is Simple Network Management Protocol (SNMP) applied in the control plane of the virtual network, the at least one extension configuration message comprising at least one extension Management Information Base (MIB) object appended to the SNMP protocol to support delivery of the at least one virtual network setting.

6. The method of claim 1, wherein the network management protocol is Network Configuration Protocol (NETCONF) applied in the control plane of the virtual network, the at least one extension configuration message comprising at least one extension Yet Another Next Generation (YANG) object appended to the NETCONF protocol to support delivery of the at least one virtual network setting.

7. The method of claim 1, wherein the at least one virtual network setting is a member of a group consisting of: a virtual network address assigned to the virtual network port deployed to map a network port of the physical server in a range of virtual addresses of the virtual network, a virtual network identifier (VNID) of the virtual network, a VPC identifier (VPC ID), a security group association for the physical server and a multicast group association for the physical server.

8. The method of claim 7, wherein the virtual network address defines an Internet Protocol (IP) address assigned to the virtual network port in the range of IP addresses of the virtual network, the virtual network port applies the IP address for the encapsulation and de-capsulation.

9. The method of claim 8, further comprising the virtual network address defines a Media Access Control (MAC) address assigned to the virtual network port, the virtual network port applies the IP address and the MAC address for the encapsulation and de-capsulation.

10. The method of claim 1, further comprising the virtual network port responds with at least one extension response message of the network management protocol to indicate a status of the virtual network port.

11. The method of claim 1, wherein each of the packets exchanged between the physical server and the at least one node of the virtual network is a member of a group consisting of: a unicast packet, a multicast packet and a broadcast packet.

12. The method of claim 1, wherein the network circuitry is utilized by a network switch connecting at least one network port of the physical server to the network such that the virtual network port is deployed in the network switch to apply the encapsulation and de-capsulation.

13. The method of claim 1, wherein the network circuitry is utilized by a Network Interface Card (NIC) of the physical server such that the virtual network port is deployed in the NIC to apply the encapsulation and de-capsulation.

14. A system for configuring a virtual network port in a physical server to support packets transfer between the physical server and other network nodes in a virtual network, comprising:

at least one processor executing a code, the code comprising:

code instructions to add at least one extension configuration message to a network management protocol used by said virtual network and to transmit at least one configuration Protocol Data Unit (PDU) comprising said at least one extension configuration message to a network circuitry connecting the physical server to the virtual network, the at least one extension configuration message comprising at least one virtual network setting for the virtual network port mapping the physical server in the virtual network;

wherein the network circuitry is configured to deploy the virtual network port to support exchange of packets between the physical server and at least one of a plurality of virtual nodes of the virtual network by encapsulating outgoing packets originated by said physical server and de-capsulating incoming packets destined to said physical server, according to at least one virtual network encapsulation protocol using the at least one virtual network setting; and wherein an execution environment of said physical server is isolated from an execution environment of said virtual network port and not executing software components of the execution environment of said virtual network port for ensuring privacy.

15. The system of claim 14, wherein the network circuitry is utilized by a network switch connecting at least one network port of the physical server to the network such that the virtual network port is deployed in the network switch to apply the encapsulation and de-capsulation.

16. The system of claim 14, wherein the network circuitry is utilized by a Network Interface Card (NIC) of the physical server such that the virtual network port is deployed in the NIC to apply the encapsulation and de-capsulation.

17. A computer program product for configuring a virtual network port in a physical server to support packets transfer between the physical server and other network nodes in a virtual network, comprising:

a non-transitory computer readable storage medium;

first program instructions for adding at least one extension configuration message to a network management protocol used by said virtual network and for transmitting at least one configuration Protocol Data Unit (PDU) comprising said at least one extension configuration message to a network circuitry connecting the physical server to the virtual network, the at least one extension configuration message comprising at least one virtual network setting for the virtual network port mapping the physical server in the virtual network;

wherein the network circuitry is configured to deploy the virtual network port to support exchange of packets between the physical server and at least one of a plurality of virtual nodes of the virtual network by encapsulating outgoing packets originated by said physical server and de-capsulating incoming packets destined to said physical server, according to at least one virtual network encapsulation protocol using the at least one virtual network setting;

wherein an execution environment of said physical server is isolated from an execution environment of said virtual network port and not executing software components of the execution environment of said virtual network port for ensuring privacy; and wherein the first program instructions are executed by at least one processor from the non-transitory computer readable storage medium.

18. The computer program product of claim 17, wherein the at least one virtual network encapsulation protocol is a member of a group consisting of: Virtual Extensible Local Area Network (VXLAN), Network Virtualization using Generic Routing Encapsulation (NVGRE), Generic Network Virtualization Encapsulation (GENEVE) and Stateless Transport Tunneling (STT).

19. The computer program product of claim 17, wherein the network management protocol is Simple Network Management Protocol (SNMP) applied in the control plane of the virtual network, the at least one extension configuration message comprising at least one extension Management Information Base (MIB) object appended to the SNMP protocol to support delivery of the at least one virtual network setting.

20. The computer program product of claim 17, wherein the network management protocol is Network Configuration Protocol (NETCONF) applied in the control plane of the virtual network, the at least one extension configuration message comprising at least one extension Yet Another Next Generation (YANG) object appended to the NETCONF protocol to support delivery of the at least one virtual network setting.

* * * * *